W. E. EVERITT.
HORSESHOE CALK SHARPENING MACHINE.
APPLICATION FILED FEB. 15, 1906.

910,464.

Patented Jan. 19, 1909.

4 SHEETS—SHEET 1.

Witnesses.
L. M. Sangster
Geo. A. Neubauer.

Inventor.
Walter E. Everitt.
By
Attorney.

W. E. EVERITT.
HORSESHOE CALK SHARPENING MACHINE.
APPLICATION FILED FEB. 15, 1906.

910,464.

Patented Jan. 19, 1909.

4 SHEETS—SHEET 2.

Witnesses.
L. M. Sangster
Geo. A. Neubauer.

Inventor.
Walter E. Everitt.
By A. J. Sangster
Attorney.

W. E. EVERITT.
HORSESHOE CALK SHARPENING MACHINE.
APPLICATION FILED FEB. 15, 1906.
910,464.
Patented Jan. 19, 1909.
4 SHEETS—SHEET 3.
Fig. 11.
Fig. 5.
Fig. 10.
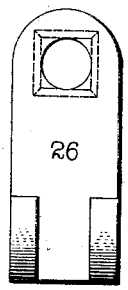
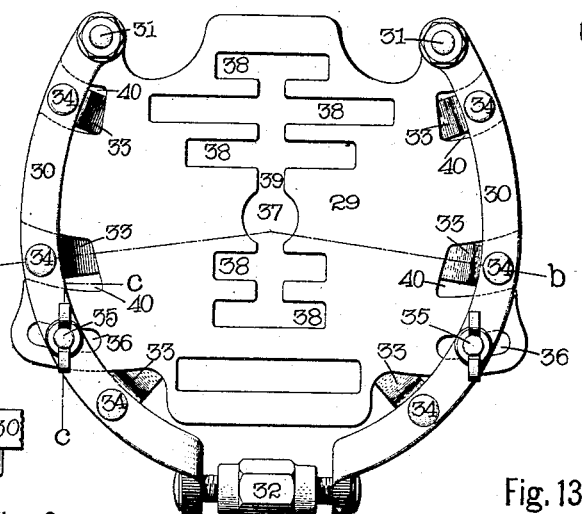
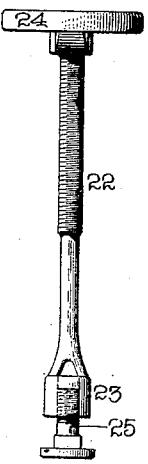
Fig. 8.
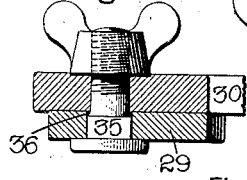
Fig. 13.
Fig. 6.
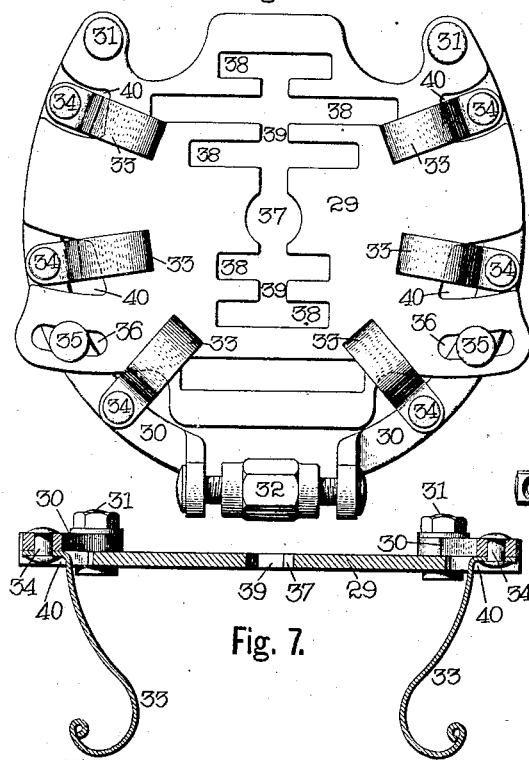
Fig. 12.
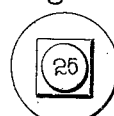
Fig. 9.
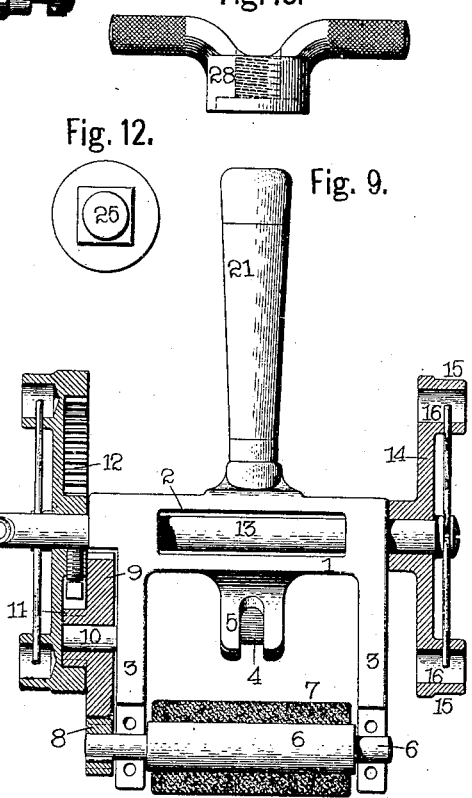
Fig. 7.
Witnesses.
L. M. Sangster
Geo. A. Neubauer
Inventor.
Walter E. Everitt.
By A. J. Sangster, Attorney.
THE NORRIS PETERS CO., WASHINGTON, D. C.

W. E. EVERITT.
HORSESHOE CALK SHARPENING MACHINE.
APPLICATION FILED FEB. 15, 1906.

910,464.

Patented Jan. 19, 1909.

4 SHEETS—SHEET 4.

Witnesses.
L. M. Sangster.
Geo. A. Neubaur.

Inventor.
Walter E. Everitt.
By
A. P. Sangster, Attorney.

UNITED STATES PATENT OFFICE.

WALTER E. EVERITT, OF BUFFALO, NEW YORK.

HORSESHOE-CALK-SHARPENING MACHINE.

No. 910,464.  Specification of Letters Patent.  Patented Jan. 19, 1909.

Application filed February 15, 1906. Serial No. 301,140.

*To all whom it may concern:*

Be it known that I, WALTER E. EVERITT, a citizen of the United States, residing at Buffalo, in the county of Erie and State of New York, have invented a certain new and useful Improvement in Horseshoe-Calk-Sharpening Machines, of which the following is a specification.

This invention relates to a machine for sharpening the calks of horseshoes.

The object of the invention is to provide a comparatively quick, convenient and economical means for sharpening horseshoe calks without removing the horseshoe from the horse's hoof or detaching the calks from the horseshoe.

A further object is to provide spring means for attaching the machine to a horse's hoof so that it may be easily and expeditiously attached or detached and so that a downward movement of the horse's hoof will simply pull the hoof from the machine without bruising or injuring the operator.

The invention also relates to certain details of construction of the machine, reference being had to the accompanying drawings forming part of this application which disclose a preferred adaptation or adaptations of the invention.

Figure 1:
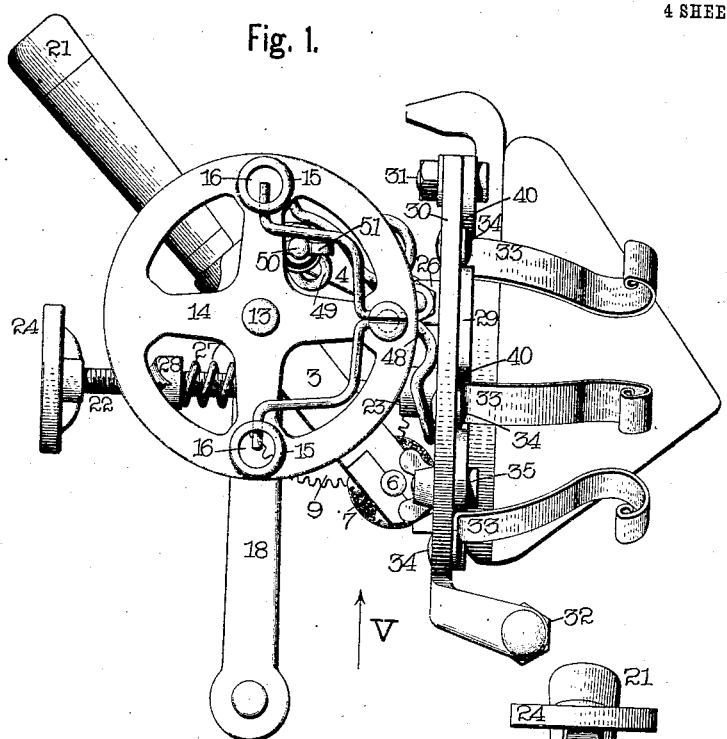
Figure 2:
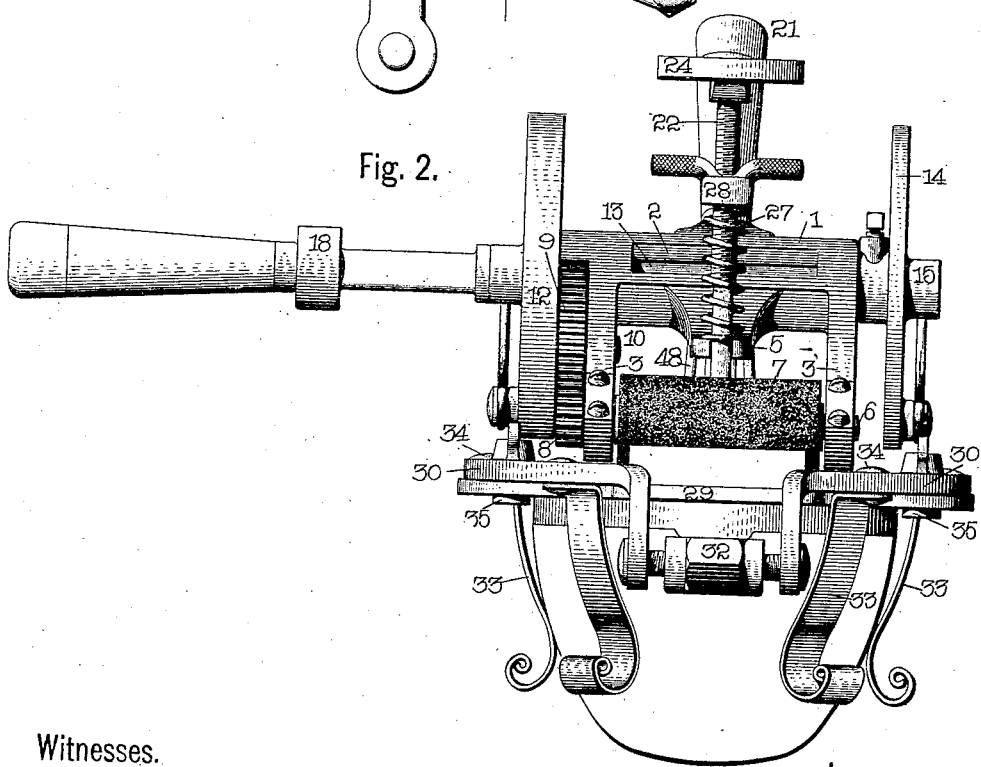
Figure 3:
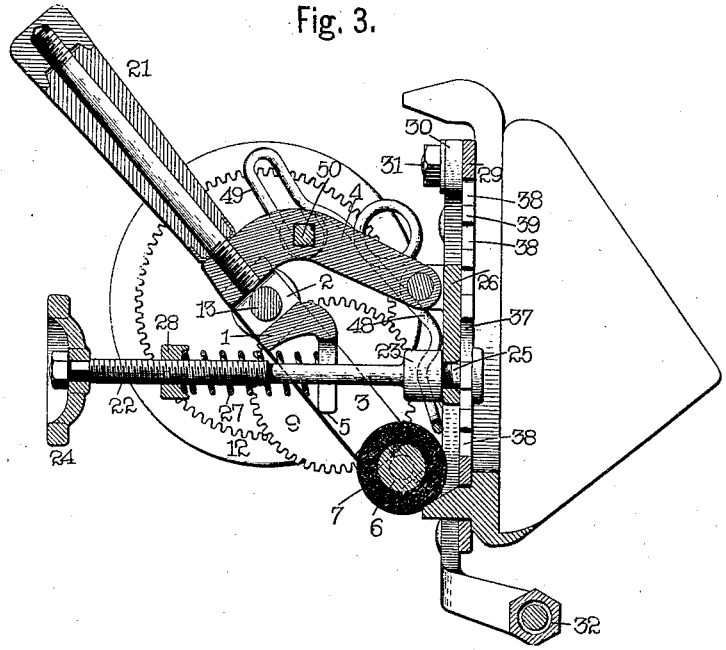
Figure 4:
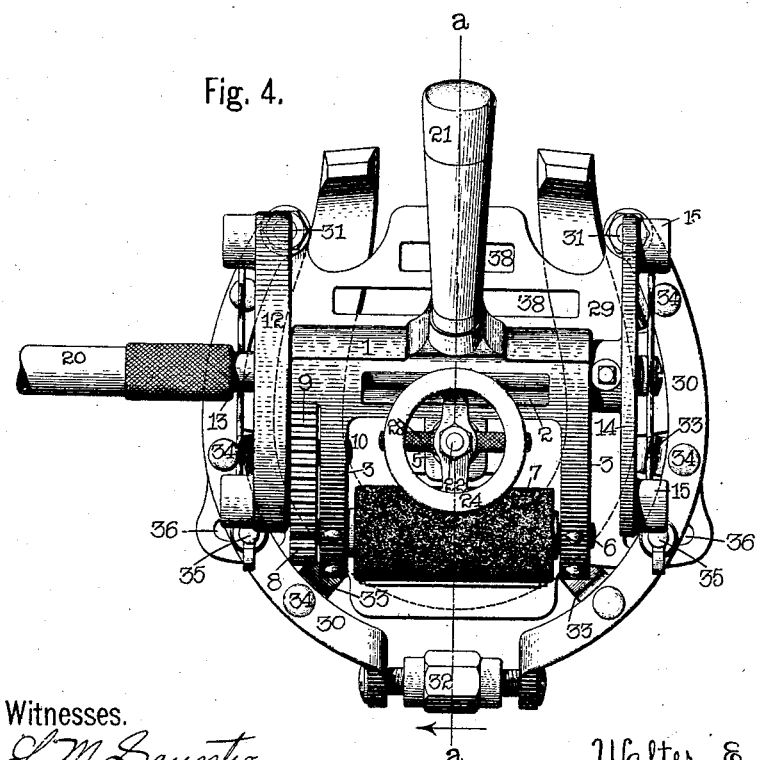
Figure 14:
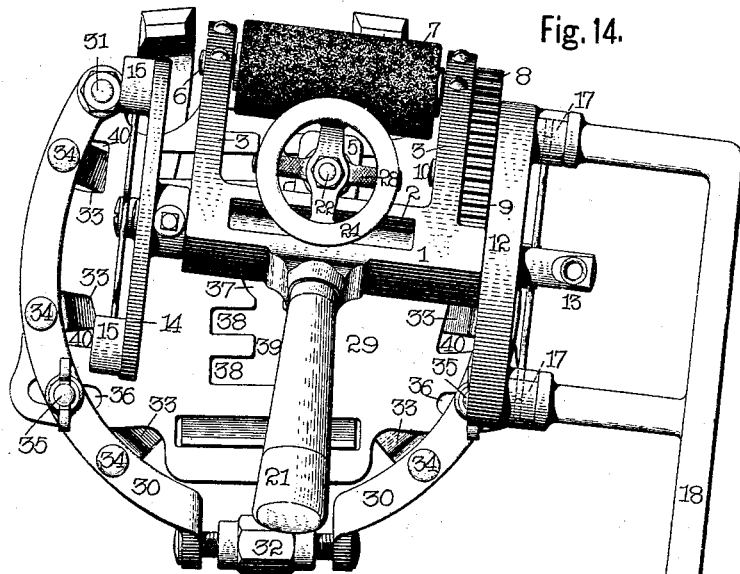
Figure 18:
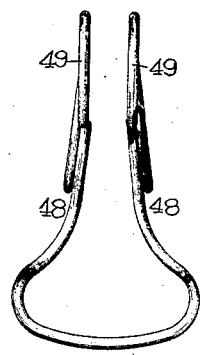
Figure 15:
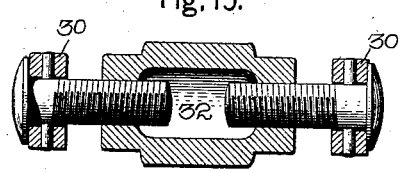
Figure 17:
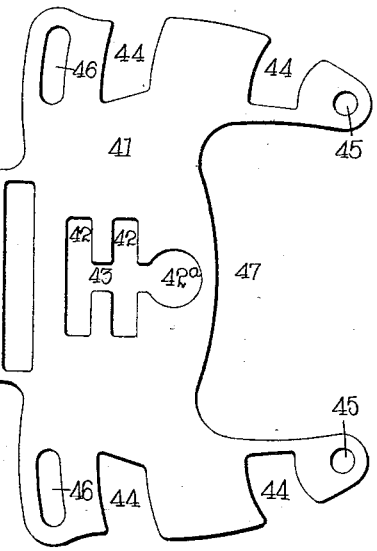
Figure 16:
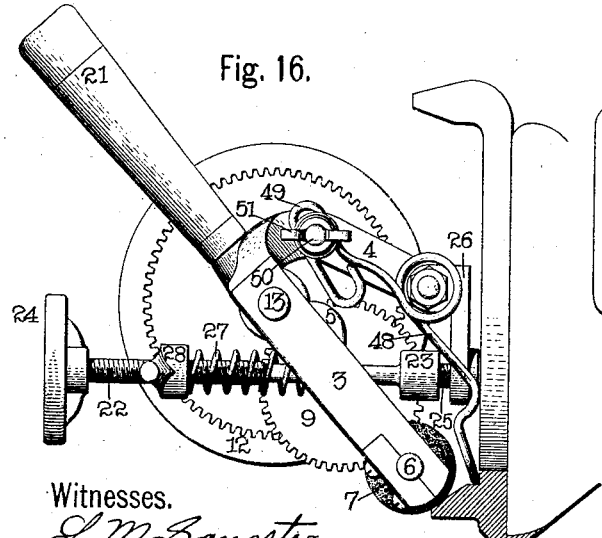

In the drawings, Figure 1 is a side elevation of the improved horseshoe calk sharpening machine showing it attached to a horse's hoof and in position to sharpen or grind down the toe-calk of the shoe. Fig. 2 is a front elevation of the machine looking in the direction of the arrow V, Fig. 1. Fig. 3 is a central vertical section through the machine and the horseshoe on or about line $a\,a$, Fig. 4. Fig. 4 is a top plan view of the machine in place on a horse's hoof, the crank for operating the machine being removed, and a flexible shaft which is coupled to the main shaft being substituted therefor to furnish the motive power. Fig. 5 is a detached top plan view of the supporting device and the curved members to which the spring holding arms are fastened. Fig. 6 is a detached bottom plan view of the slotted plate and the curved members, showing the spring holding arms. Fig. 7 is a transverse section on line $b\,b$, Fig. 5, through the slotted plate and the curved members and through two of the spring arms which hold the device in place on the hoof. Fig. 8 is an enlarged section on line $c\,c$, Fig. 5, through the slotted plate and one of the curved members, showing the screw for locking the curved members in their adjusted position. Fig. 9 is a detached top plan view of the frame carrying the grinding wheel, showing a section through the gearing which operates said grinding wheel. Fig. 10 is a detached side view of the rod and hand wheel. Fig. 11 is an enlarged detached plan view of the link. Fig. 12 is an enlarged detached plan view of the shouldered screw which passes through the link and screws into the button on the rod. Fig. 13 is an enlarged detached side view of the adjusting nut for tensioning the pressure spring. Fig. 14 is a view of the machine similar to Fig. 4, showing the grinding mechanism turned and in position to grind or sharpen a heel calk, the flexible shaft being removed and the crank being shown in position to operate the machine. Fig. 15 is an enlarged detached section through the adjusting nut for adjusting the curved members. Fig. 16 is a side view of the device in position to be used without the slotted plate; the supporting spring being shown brought forward into position to support the device from the horseshoe which is shown in section. Fig. 17 is a detached plan view of another form of slotted plate which is used when the horse is equipped with rubber pads. Fig. 18 is a detached plan view of the supporting spring which may be used in some instances instead of the supporting device.

In referring to the drawings for the details of construction, like numerals designate like parts.

The machine comprises a frame which is adapted for attachment to a horse's hoof, a sharpening mechanism which is adjustable so that it may be brought into sharpening position with reference to any of the horseshoe calks, and mechanism for operating the sharpening mechanism.

The frame proper of the machine is preferably forged or otherwise formed in one piece of metal and comprises a transverse member 1, which is provided with a longitudinal slot 2, parallel longitudinal members 3, which project forward from the respective ends of the slotted member 1, an angular member 4, extending upward from at or near the center of one of the side portions of the slotted member and a forked angular member 5, extending forward from at or near the center of the other side portion of the slotted member.

A shaft 6, is journaled in the forward ends of the parallel members 3, and a cylinder of abrasive material 7, is mounted on the shaft 6, between the members 3. The shaft 6, projects on one side of one of the members 3, and has a gear wheel 8, mounted thereon which meshes with an idle gear wheel 9, journaled on a short shaft 10, extending and supported from said frame member 3. A pinion 11, is also journaled on the short shaft 10, and is fastened to the idle gear wheel 9, so as to revolve in unison therewith. The pinion 11, meshes with an internal gear wheel 12, which is connected on one end of a main driving shaft 13, journaled in the slotted member 1, of the frame. A disk 14, is mounted on the opposite end of the shaft 13, which has one or more lateral projections 15, provided with sockets 16, to receive the ends 17, of a turning handle 18. The driving shaft is also adapted to be attached to the flexible shaft of any well known power supplying means so that the machine may be operated either by hand or supplied power as desired. A fragment of a flexible shaft 20, is shown in the drawings attached to the main driving shaft 13.

A handle 21, is fastened to about the center of the transverse frame member 1, and extends rearwardly therefrom and is adapted to be grasped by one hand of the operator to adjust the machine relatively to the calks and to direct the machine in its sharpening operation.

A means for detachably and adjustably securing the frame to a supporting device which in turn is attached to a horse's hoof, is provided, which is supported by the angular frame members 4 and 5, and comprises a rod 22, having an enlargement 23, at lower end, and a hand wheel 24, secured to its upper end.

The rod 22, has its upper portion screw threaded and supported loosely in place by the forks of the frame member 5, and its lower enlarged end 23, provided with a vertical screw threaded opening into which the screw threaded shank of a bolt 25, is adapted to screw. The bolt 25, has a comparatively large and flat circular head, and the portion of the shank nearest the head is made square in cross section the purpose of which will be described further on. The bolt passes loosely through an opening in a link 26, which is pivoted at its opposite end to the frame member 4.

A coiled spring 27, is loosely fitted around the rod 22, above the forked member 5, and the tension of said spring is regulated by the hand nut 28, on the screw threaded portion of the rod 22, see Figs. 1, 2, 3, and 16.

The spring 27, bears against the forked member 5, and tends to turn the frame on its pivot and so bring the grinding cylinder 7, into contact with the calk of the horseshoe.

In connection with the machine two different forms of supporting devices are used one being adapted for use with an all metal horseshoe and the other with a horseshoe which is in part composed of rubber. The first of these supporting devices or the device adapted to an all metal shoe consists of a flat plate 29, and two opposed curved side members 30, which are each pivoted at one end to the plate by a pivoting screw 31, and are adjustably joined together at their opposite ends by a turn buckle 32.

A series of angular or bent spring arms 33, extend at intervals from the side members 30, which are adapted to be sprung around the hoof of a horse to detachably fasten the device thereto. The spring arms 33, are secured to the side members by rivets 34.

The curved side members 30, are supported from the plate 29, at intermediate points by bolts 35, which pass through slots 36, located near the edge of the plate and are limited in their movement toward or from each other through the operation of the turn buckle to the length of the slots 36.

The flat plate 29, is provided with a circular opening 37, sufficiently large to permit the passage of the flat head of the bolt 25, and a series of transverse slots 38, which are connected by a common longitudinal elongated opening or passage-way 39, extending from the opening 37, which is arranged about approximately central in the plate.

The slots 38, are arranged at intervals in the body of the plate, some being located on one side of the opening 37, and some on the other side of the said opening.

The purpose of the openings 37 and 39, and slots 38, is to provide for attaching the machine frame to the plate by inserting the head of the bolt 23, in the opening 37, and moving the same in the elongated opening 39, to any desired place.

The advantage of the slotted plate is that the machine may be easily attached to or detached from the same and may be adjusted to bring the same into position to sharpen any of the calks of a horseshoe.

The frame is locked in place by turning the rod 22, by means of the hand wheel, which draws up the bolt 25, and thus grips the link 26, between the enlarged end 23 of the rod, and the plate 29. The bolt is prevented from turning owing to the square portion of the shank, which seats in the slot 38, as shown in Fig. 3. The plate is also cut out at intervals in its side margins to leave depressions or recesses 40, through which the spring arms 33, may project and which permit sufficient movement to said arms without interference to allow for the adjustment of the curved side members 30, toward each other. A slotted plate 41, of a different form is employed when the machine is used to sharpen the calks of a horseshoe which are in part composed of rubber, being formed substantially as shown in Fig. 17. This plate 41, is provided with two transverse slots 42, which are connected by a common elongated opening 43, with an opening 42ª sufficiently large to permit the passage of the head of the bolt 25; side recesses or depressions 44, pivot openings 45, and slots 46, through which bolts are passed to adjustably fasten the curved side members to the plate near one end thereof.

The forward portion of the plate is cut away sufficiently between the two pivot openings 45, to leave a large deep recess 47, which provides space for the rubber tread and thus enables the plate to be fitted close to the horseshoe. In some instances it may be found necessary to dispense altogether with the supporting device and in that case it will probably be advisable to employ a spring to assist in maintaining the machine in proper relationship with the horseshoe in the manner shown in Fig. 16.

The preferred form of spring is of an angular shape having two bent portions 48, which extend substantially parallel and are provided with loop ends 49, through which the screw threaded ends of a bolt 50, extending through the angular frame member 4, fit; said loop ends being adapted to slide upon the bolt ends to enable the spring to be adjusted into and out of supporting position.

The spring, when the machine is employed with a supporting device, may be moved out of supporting position, or when used by itself, may be moved into supporting position by simply moving the loop ends 49, on the bolt 50. Thumb nuts 51, are placed upon the bolt ends to lock the loop ends in their adjusted position.

The operation of the machine is as follows,—The horse's foot is first lifted by the operator and bent to insert the horseshoe and hoof. When the supporting device is used, a plate of about the size of the horse's hoof is fitted upon the hoof by springing the arms 33, about the hoof the side members 30, being adjusted to bring the arms into substantially the same shape and size as the outline of the horse's hoof, so that the said arms will engage properly against the surface of the hoof. The machine is now detachably secured to the plate by fitting the head of the bolt 25, through the central opening 37, in the plate and sliding the rod in the common elongated opening 39, to the point necessary to properly engage the abrasive roll with the surface of the calk to be sharpened. The frame is then locked in place by turning the hand wheel 24, as above described. The abrasive roll 7, is yieldingly maintained in contact with the calk it is desired to sharpen by the coiled spring 27, and said pressure may be regulated by proper adjustment of the hand nut 28, on the rod 22.

When using the machine without the supporting device and with the angular spring heretofore described, the machine is simply supported by the operator's hand against the tension of the spring in contact with the horseshoe and hoof when in inverted position and in the position desired. The spring serves to steady the machine in position and to press it out of engagement when the hand pressure is removed.

The chief advantages of this improved machine are that it is easily and quickly attached and detached from the horse's hoof, that it will spring out of attachment should a horse remove his foot, and that it can be adjusted very quickly to any calk and will sharpen very rapidly.

With this improved machine, the action of a horse in pulling its foot downward will merely result in withdrawing its hoof from the machine, leaving the machine in position between the operator's knees. This is due to the fact that spring means instead of a rigid clamp is employed for attaching the machine to the hoof, and results in obviating any danger of injury to the operator from a restless horse.

I claim as my invention:

1. A machine of the class described, including a frame, an abrasive calk sharpening roll rotatably mounted in said frame, a driving shaft journaled in the frame and gearing connecting the driving shaft to the abrasive roll, in combination with a supporting device and spring means for attaching said supporting device to a horse's hoof sufficiently to retain it in operating position.

2. In a machine of the class described, the combination with calk sharpening mechanism, of a supporting device for said calk sharpening mechanism adapted to be sprung into and out of engagement with the hoof of a horse, and including a slotted plate and two opposed side members each carrying a series of spring arms.

3. In a machine of the class described, a supporting device adapted to be yieldingly attached to the hoof of a horse, and including a plate having an opening and a series of slots connected to each other and to the opening by a common elongated opening, and calk sharpening mechanism having a rod provided with an enlargement or button adapted to fit through the opening, and to be moved in the slots and elongated opening, whereby the calk sharpening mechanism may be adjusted to sharpen any of the calks of a horseshoe.

4. A machine of the class described, having calk sharpening mechanism and spring means for attachment to the hoof of a horse.

5. A machine of the class described having calk sharpening mechanism and means for attachment to the hoof of a horse including a plate and two side members adjustably secured to the plate and provided with a series of spring arms.

6. A machine of the class described having calk sharpening mechanism and means for attachment to the hoof of a horse including a plate and two side members pivoted at one end to the plate and adjustably connected to their opposite ends by a turn buckle and provided with a series of spring arms.

7. In a device of the class described, means detachably secured to the hoof of a horse and including a plate having a series of transverse slots connected by a common longitudinal slot and calk sharpening mechanism having an element adapted to be connected to the slotted plate and to be shifted to different slots in said plate to adjust the calk sharpening mechanism.

8. In a machine of the class described, a frame, calk sharpening mechanism supported by said frame, and spring means for detachably securing said frame to the hoof of the horse's foot, said spring means being sufficiently stiff to secure the frame to the hoof of the horse firm enough to permit the operation of the calk sharpening mechanism and sufficiently yielding to allow the detachment therefrom.

WALTER E. EVERITT.

Witnesses:
L. M. SANGSTER,
GEO. A. NEUBAUER.